United States Patent
Eliezer et al.

(10) Patent No.: US 6,912,511 B1
(45) Date of Patent: Jun. 28, 2005

(54) METHOD OF MONITORING MARKET LIQUIDITY

(76) Inventors: David A. Eliezer, 250 Mercer St., Apt. 8202, New York, NY (US) 10012; Ian I. Kogan, 37 St. Margarets's Road, Oxford OX2 6LD (RU)

(*) Notice: Subject to any disclaimer, the term of this patent is extended or adjusted under 35 U.S.C. 154(b) by 830 days.

(21) Appl. No.: 09/641,675

(22) Filed: Aug. 18, 2000

Related U.S. Application Data (60) Provisional application No. 60/149,837, filed on Aug. 19, 1999.

(51) Int. Cl.[7] .............................................. G06F 17/60
(52) U.S. Cl. .......................................... 705/37; 705/36
(58) Field of Search ...................................... 705/36, 37

(56) References Cited

U.S. PATENT DOCUMENTS

| | | | | |
|---|---|---|---|---|
| 5,297,032 A | * | 3/1994 | Trojan et al. | 705/37 |
| 6,272,474 B1 | * | 8/2001 | Garcia | 705/37 |
| 6,405,180 B2 | * | 6/2002 | Tilfors et al. | 705/37 |
| 6,408,282 B1 | * | 6/2002 | Buist | 705/37 |
| 2003/0097325 A1 | * | 5/2003 | Friesen et al. | 705/37 |

FOREIGN PATENT DOCUMENTS

WO     WO-97/22072 A1 * 6/1997

OTHER PUBLICATIONS

Anon., "France: A Special Report Prepared by Banque Paribas," Euromoney, 1997 Guide to Repo and Securities Lending Supplement, The, pp. 4–5, Mar. 1997.*

* cited by examiner

*Primary Examiner*—Nicholas D. Rosen
(74) *Attorney, Agent, or Firm*—Howrey Simon Arnold & White, LLP (57) ABSTRACT

The present invention provides market participants the ability to infer the current internal state, i.e., the depth and activity of active buyers and sellers, in a variety of markets, such as double-auction markets. The invention does so by measuring certain averages and correlations of various indicators of market liquidity and producing useful market liquidity assessments and trader recommendations as a result.

Various measures of market liquidity such as the bid-offer spread, the time to mid-market trade, spread fluctuations, deal rate, and bid and offer size are correlated, and monitored to assess a market's current internal state. From that information, the relationship between fluctuations in the bid price and the average number of buyers can be calculated to determine whether, for example, there is an excess of buyers or sellers in the market. Accordingly, based upon such calculations, accurate trader recommendations may be produced.

41 Claims, 4 Drawing Sheets

METHOD OF MONITORING MARKET LIQUIDITY

This patent application claims priority to U.S. provisional patent application Ser. No. 60/149,837 filed on Aug. 19, 1999.

BACKGROUND OF THE INVENTION

1. Field of the Invention

The invention relates generally to a method of assessing the current state of a market and, in particular, to a method of measuring and monitoring a market's liquidity to make trader recommendations.

2. Description of Related Art

Those who work in financial markets such as stock markets and bond markets are continuously striving for better, more accurate methods and techniques for predicting market performance and trends, and for more efficient, less risky methods of trading. Many methods have been devised for analyzing past and present market characteristics to extrapolate future performance. However, most prior art methods are limited to pointing out those future trends that are most likely based upon past performances under similar conditions. Since the number of factors that may influence market conditions is almost infinite, it is nearly impossible to accurately predict how a market will perform based solely upon a limited sampling of past data.

One critical limitation in prior art methods is that they do not accurately assess current market conditions. Market parameters such as volume, various indexes, bid-offer spreads, etc., only tell a very small part of the overall condition of the market. Consequently, without a more accurate assessment of a market's present condition, it is virtually impossible to determine how a market can be expected to perform in the near future, and accordingly, to make accurate recommendations based upon that limited picture (e.g., whether to buy, sell, etc.).

In addition, prior art methods that form a more accurate market picture taking into account a wider sampling of market parameters usually do not produce analyses of market condition in a timely enough fashion to be of assistance to traders. For traders who make a living predicting market performance and capitalizing on upward or downward movements as slight as ⅛ of a point, immediate determinations of market conditions is essential, as a few seconds can make the difference between profit and loss.

Therefore, there is a need for a method that accurately assesses a market's present condition and can, based upon that assessment, recommend a course of action. Moreover, there is a need for improved techniques that provide an accurate view of market changes over very short time periods.

SUMMARY OF THE INVENTION

The present invention provides new and significant advantages over the prior art. Basically, the present invention infers a market's current state—the depth and activity of its active buyers and sellers—by measuring averages and correlations of various indicators of market liquidity and producing useful trader recommendations as a result.

The present invention can be applied to any market, but is particularly suited to double auction markets. Various measures of market liquidity such as the bid-offer spread, the time to mid-market trade, spread fluctuations, deal rate, and bid and offer size are correlated, and monitored to assess a market's current internal state. From that information, the relationship between fluctuations in the bid price and the average number of buyers can be calculated to determine whether, for example, there is an excess of buyers or sellers in the market. Accordingly, based upon such calculations, accurate trader recommendations can be produced.

Additionally, the present invention, which is preferably embodied in a software program, can use data found on any common trader screen, such as bid and offer data, volume, and bid and offer size, to infer a market's internal state over extremely short periods of time (e.g., seconds or minutes). This in contrast to prior art methods that produce market assessments and trader recommendations by assembling and analyzing days or weeks worth of data.

DETAILED DESCRIPTION OF THE PREFERRED EMBODIMENTS

The present invention may be applied to any double auction market in which buyers and sellers participate. In particular, the methods of the present invention are especially well suited to markets, such as interdealer broker markets, that are dominated by professional traders who trade mainly through limit orders, watch markets closely throughout the trading day, and move their limit order prices frequently.

A market is a collection of buyers and sellers, together with a set of rules of behavior, usually enforced by an exchange. The role of the exchange is to enforce these rules and publish information about the commitments of the buyers and sellers (generically referred to as traders or participants), to all the participants. Formalized markets such as these are generally designed to trade units of identical items, such as shares of stock, or barrels of oil. Such goods are said to be "commoditized", (i.e., made into commodities), when they are made identical, so that they can be traded interchangeably on an exchange. Examples of markets include the New York Stock Exchange, the Chicago Board of Options, and the London Stock Exchange. Markets are thus organized systems of trading, designed to seek out the best prices for market participants by ensuring that buyers get the lowest selling price available and sellers get the highest buying price available.

Traders in any market have the option to trade either by a limit order, or by a market order. When a trader makes a limit order, he specifies a trading price to the exchange, which is the best price at which the trader is willing to trade. The highest price at which a buyer is willing to buy is known as his "bid". The lowest price at which a seller is willing to sell is known as his "offer" or "ask". When a trader specifies a bid or ask, he must also specify a size, the number of shares (or units of the commodity) that he is committing to buy/sell at that price. Traders may change their bids and offers at any time, adjusting them up or down, or withdrawing them altogether. Alternatively, traders may trade by a market order, in which they direct the exchange to conclude a trade for them with the best trading price available at that time, either with the highest bid (if the trader is a seller) or with the lowest offer (if the trader is a buyer). A "double auction market" is one in which all of the prices at which market order traders may trade at are specified by the limit orders of other traders. The best known example of a double auction market is the New York Stock Exchange, and many, if not most of the other major markets in the world are of this type.

An exchange collects transactional information and publishes a summary of it to all market participants, removing all information that would identify which traders are bidding or offering. Most commonly, for example, the exchange publishes the highest of all the bids, (the "best bid") and the lowest of the offers (the "best offer"). In addition, it publishes the combined size of all bids at the best bid, (the "best bid size," or just the overall "bid size") and the total size of all the offers at the best offer (the "offer size"). In some markets, the second or third best bids and offers are also disclosed, as well as their sizes. These are known as "bids behind" the best bid and "offers behind" the best offer. In addition, on the trading screen published by an exchange, one usually sees the volume (i.e., the number of shares, contracts, etc.) traded so far that day, and the prices at which the last few trades occurred.

When a bid price coincides with an offer price, the exchange notifies each party, and arranges that the trade take place. This is known as the brokering function. The exchange also polices the marketplace, ensuring that traders honor the trades to which they have committed themselves. At times, when a market lacks sufficient traders to be reasonably liquid, the exchange arranges with a third party to play a market-making function. The market-maker acts as a trader of last resort, maintaining a bid and an offer in the market at all times, good for all sizes up to some limit. The market-maker typically agrees to maintain a bid and offer no farther apart than a limit set by the exchange, and is compensated for this service by the trading profits he is able to make.

The market-making function ensures that there is always at least one buyer, the market maker, for those who wish to sell their shares (for example) at the going price. Likewise, the market-maker also ensures that there will be a seller for traders who wish to purchase shares at the market's price.

When markets are easy to trade in, they are said to be "liquid." A good bid or offer is either always available in the market, or may be found by waiting only a short time. When they are hard to trade with, they are said to be "illiquid," because one must wait a long time for a good bid or offer. The notion of liquidity is only qualitatively defined; it cannot be measured directly. However, there are many market parameters which describe, to some extent, the "ease of trading," in a market. Such parameters are known as "proxies" for liquidity. Some of the best known proxies for liquidity are the bid offer spread, the time to trade at the mid-market, bid and offer size, fluctuations in the bid-offer spread and trade prices, and the deal rate.

Because the best bid is never the same as the best offer, one can never buy stock and immediately resell a stock, bond, or other commodity without losing money equal to the difference between the bid and the offer. The difference between the best bid and the best offer is known as the "bid-offer spread," or just the "spread." In a double auction market, the spread fluctuates second-by-second, so the bid-offer spread is generally understood to be a time-average of the instantaneously measured bid-offer spread. The bid-offer spread thus represents a cost of trading, which can change from hour to hour. Since it is clear that the entrance of additional traders to the market can only decrease the bid-offer spread, this measure of liquidity is associated with a large number of traders being present. In fact, this is generally true of all the proxies for liquidity, and so liquidity itself is generally associated with having a large number of traders present in a market.

A trader can buy and resell without cost, by placing a bid at the mid-market, and then afterwards placing an offer at the same price. However, this maneuver also may not be a trivial operation, because the trader must wait, possibly for a very long time before these limit order trades are filled. In addition, there is no guarantee that the limit orders will ever be filled, and so it is possible the trader will buy stock, but never sell the stock at its original buying price, and simply be stuck with it. This waiting time is referred to as the "time to mid-market trade," and it also represents a cost of trading. The costs are all the greater because of the attendant risk that one of the limit orders might never be filled at all. Here again, the addition of more traders can only shrink this waiting time and reduce risk, and so once again, liquid markets, as measured by this proxy, are associated with a greater number of traders being present.

If a trader wants to trade a small number of shares of stock, he needs not worry too much about being able to find another trader who will quickly trade with him at a good price, when he trades through an organized market. However, trading a large number of shares can be significantly more difficult. A trader may have to take the best bid/offer and several others behind, which can significantly increase his cost. How far behind the best bid/offer a trader must go to get a large order filled depends upon the size of the best bid/offer, and the bid size or offer size. Both the bid and offer sizes, and the depth one must go beyond them to fill a large order, represent further proxies for liquidity. The bid and offer size can only increase when traders are added to the market, so liquidity as measured by this proxy is also associated with greater numbers of traders present in the market.

Trying to buy and sell immediately without cost can be made more difficult if the best bid and best offer are fluctuating. A trader may place a bid only to find that the market is now trading the stock at much higher prices, and the order will not be filled. Equally frustrating, a trader may find that the market immediately seizes his bid as it moves to much lower prices. Buying and immediately reselling at the same price is difficult to do under these conditions, and this market volatility is likely to increase the costs a trader must pay to buy and immediately resell. This is, therefore, another proxy for liquidity. The entrance of additional traders to the market can only make the markets slower to jump, so as with the other proxies, this proxy associates liquidity with a larger number of traders.

Although most proxies for liquidity are defined so that they are symmetric with respect to the buyer and seller sides of a market, fluctuations in either the bid or the offer may be thought of separately as proxies. Consequently, it may be useful to compute cross-correlations and other higher moments of these quantities, and include such "asymmetric" proxies, as well as other market quantities, within the methods of the present invention.

The deal rate is the rate at which trades are concluded. The addition of more traders to the market can only increase the deal rate, so the deal rate is a good way to measure the number of traders present. Because market liquidity, from the discussion above, is generally associated with larger numbers of traders present, the deal rate is considered a proxy for liquidity.

Each of the above-described liquidity proxies has the property that it either always increases as liquidity increases (e.g., the deal rate, the bid/offer size), or always decreases as liquidity increases (e.g., the spread, fluctuations in prices, the time to trade at mid-market). Quantities with these properties are said to be "monotonic." Thus, liquidity may be better understood by analyzing relationships among the proxies themselves. Certain relationships that are rather intuitive include: (1) the higher the deal rate, the smaller the bid-offer spread; (2) the higher the deal rate, the more quickly a market participant can trade at the mid-market; and (3) the higher the deal rate, the greater the density of traders.

However, there are much more intricate relationships between the various liquidity proxies. The relationships between such parameters have been studied and are detailed in "Scaling Laws for the Market Microstructure of the Interdealer Broker Markets," D. Eliezer, I. Kogan, incorporated herein by reference. See, Los Alamos National Laboratory Research Library, Los Alamos, N.M.; Ref. No. OUPT-98-64-P, cond-mat/9808240. The inventors have found that the bid-offer spread in such markets scales as $$\sqrt{\frac{1}{DealRate}}.$$

In addition, the inventors have that other relationships between market parameters may be scaled, such as fluctuations of the best bid/offer and the density of buyers/sellers. Other proxies of liquidity, scaled as functions of the Deal Rate (J), include:

Bid/offer spread (S):

$$S \sim J^{-1/2}$$

Time to mid-market trade ($\tau$):

$$\tau \sim J^{-1}$$

Trader density near the best bid/offer ($\Xi$):

$$\Xi \sim J^{1/2}$$

Mid-market variance ($\xi$):

$$\xi \sim J^{-1/2}$$

Figure 1:
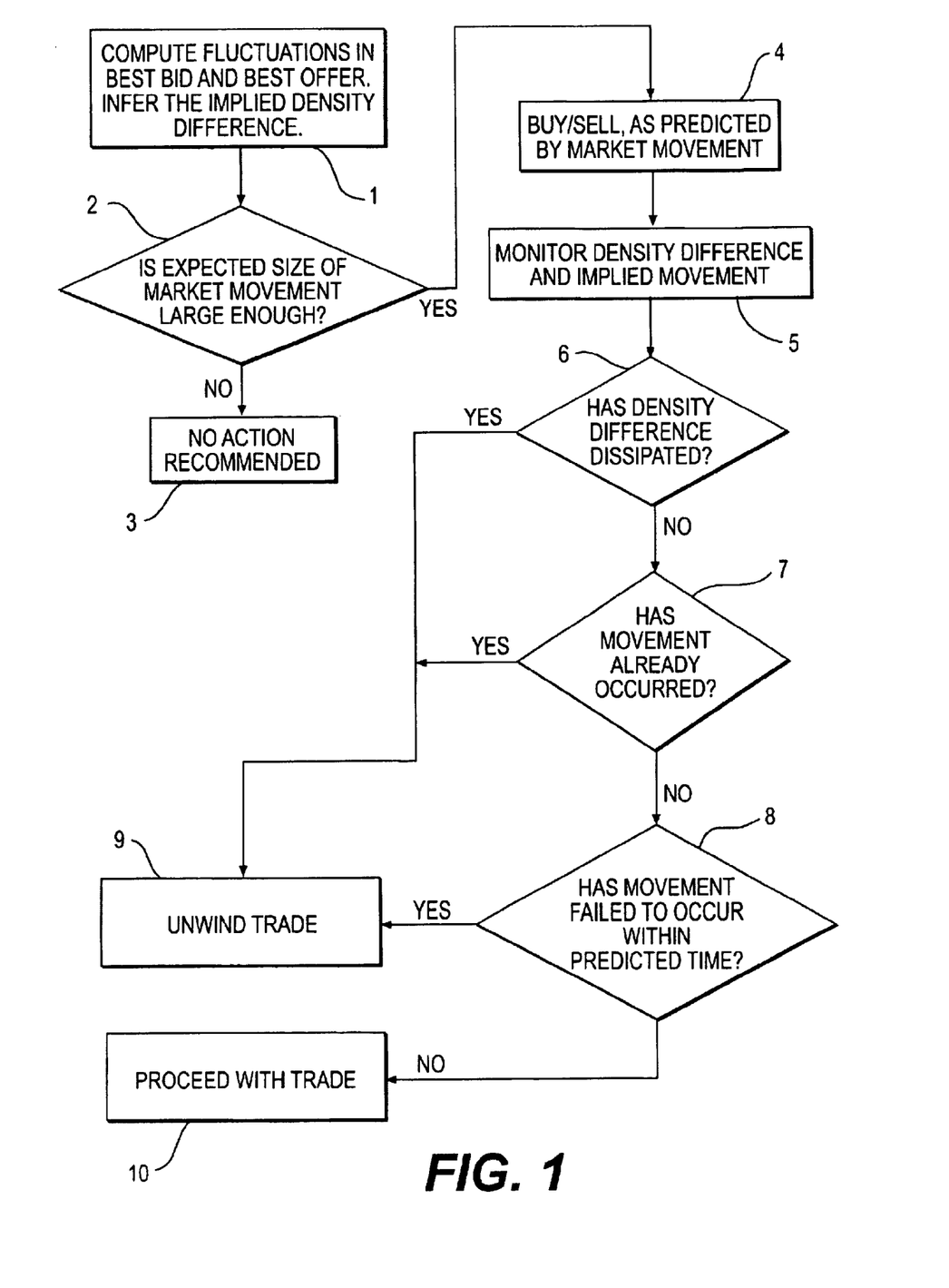
FIG. 1 is an overview flowchart of one embodiment of the present invention.

FIG. 1 is an exemplary flowchart of a manner in which the methods of the present invention may be employed to produce a useful trader recommendation. In this example, data regarding fluctuations of the best bid is used to infer information about the density of buyers behind the best bid, and similarly infer the density of sellers behind the best offer, 1. If these numbers are not in balance, such that there is an excess of one type of trader over the other, then the expected response of the market to this excess may be calculated. In fact, both the size and timing of this response may be calculated, 2. In accordance with these calculations, no action may be recommended, 3, or a buy or sell may be ordered to capitalize on the predicted market movement, 4. Next, the fluctuations in both the best bid and best offer may be monitored continuously, and at each time, the expected response to the measured densities may be inferred, 5. Based upon these continued measurements, the buy/sell order may be executed, 10; or unwound (i.e., withdrawn) 9, if it is determined that the density difference has dissipated, 6, the market movement has already occurred, 7, or the market movement has not materialized within the predicted time frame, 8.

Figure 2:
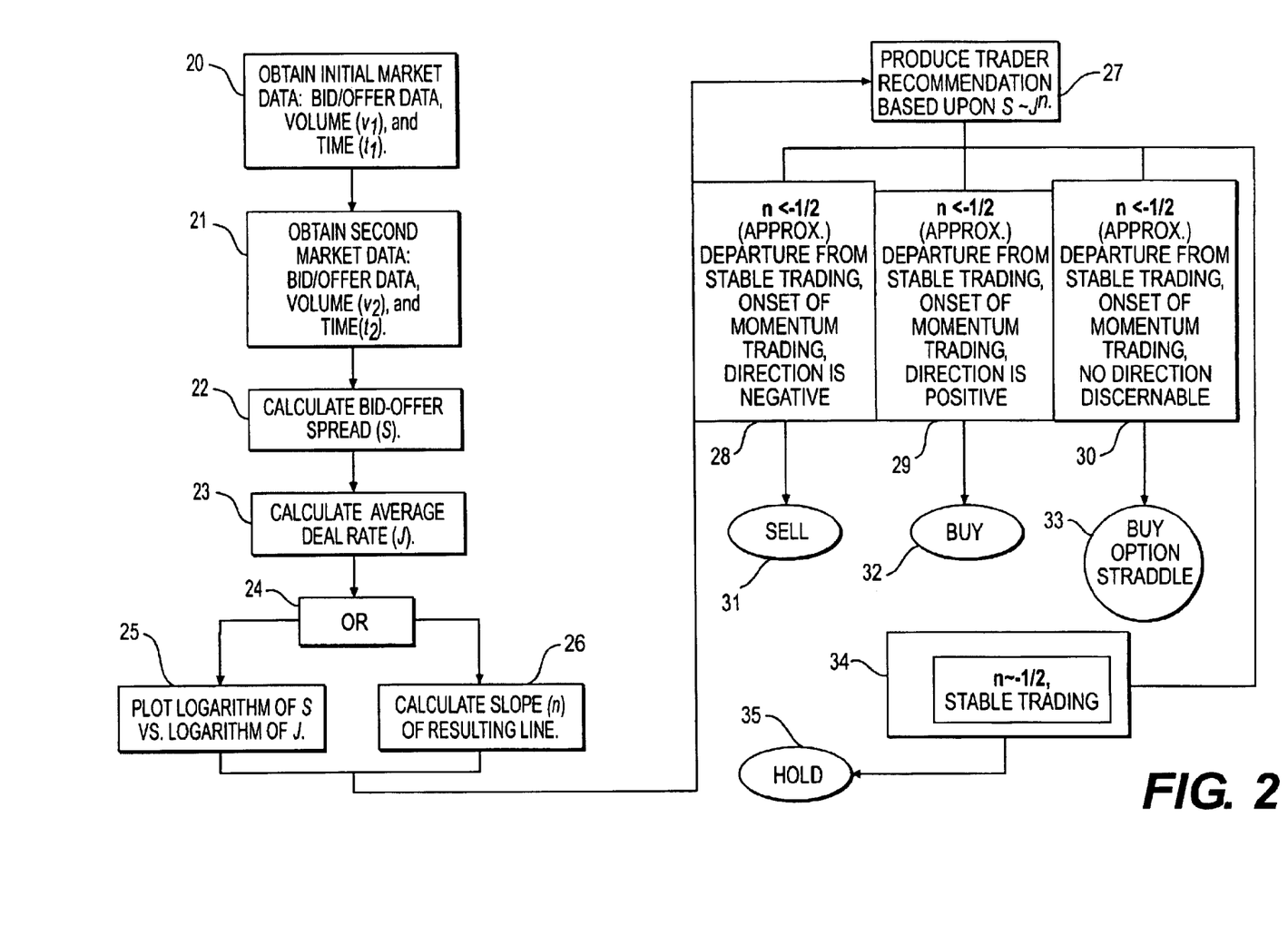
FIG. 2 is a flowchart of the preferred embodiment method of the present invention.

FIG. 2 depicts an exemplary flowchart of the method of the preferred embodiment employing certain scaling laws to produce trader recommendations in accordance with the market's internal state. Generally, the scaling laws are relatively constant when the market is relatively quiet and static. By contrast, when the market is moving, because of the building presence of momentum-type traders, these scaling laws can be expected to change. In particular, in the prelude to a large market movement or market crash, the exponent of the bid-offer spread scaling law can be expected to change drastically, narrowing as the market intensifies, then widening out as traders shift to market order trading from limit order trading. Thus, the averaged bid-offer spread is measured over many intervals, together with its deal rate, and the corresponding scaling law calculated. When the exponent of the scaling law departs from its expected equilibrium value of approximately $-\frac{1}{2}$, the invention may alert a trader as to imminent jump-like behavior in the market so that the trader may react accordingly.

The embodiment depicted in FIG. 2 may be employed without the trader having knowledge of the direction of the market movement, by buying an option straddle, i.e., both a put and call, an order that makes money on large market movements of either direction (and loses money in stable, quiet markets). If the direction of a market movement can also be discerned, then a trader might simply buy or sell stock as appropriate to the expected direction.

In addition, traders may employ the scaling laws as indicated in FIG. 2 to simply monitor the liquidity of a market over time. It is common for trading losses to occur due to the sudden appearance of a "liquidity hole," i.e., a sudden loss of liquidity in the market. Thus, the averaged bid-offer spread, the averaged deal rate, and other proxies, as calculated in FIG. 2, for example, may be monitored continuously as a trading aid, warning traders of impending holes, and signaling periods of favorable market liquidity.

Considering the preceding example in which the scaling of the bid-offer spread is used as an indicator of the onset of market movement. The scaling laws can be measured by observing the best bid, best offer, and volume every tenth of a second, for example. The average of the spread can then be computed as a simple arithmetic average. FIG. 2 depicts the use of such scaling laws to produce useful trader recommendation in accordance with the preferred embodiment of the invention.

In step 20 of FIG. 2, at the beginning of the time average, the initial value of the best bid, best offer, volume and the initial time are recorded. These values are again recorded at a second time, 21, which is later than the initial time. These values are preferably recorded at regular intervals small enough to record every movement of bid and offer prices. The data is preferably recorded to a data file of any well-known format that can be continuously written to and read from. Additionally, the data file is preferably stored on a recordable medium such as a hard disk drive or writeable CD-ROM that is either located within the system of the present invention, or centrally located in a network such that it can be quickly accessed.

The bid-offer spread (S) is thus calculated by time-averaging the difference between the best bid and best offer, 22. Those skilled in the relevant art will recognize the standard mathematics involved in performing such a calculation. In addition, a statistical error associated with this average is preferably calculated. In the preferred embodiment, new data points are continuously added to the average until the statistical error associated therewith is below a pre-selected accuracy. The statistical error associated with these averages can be calculated in any well-known manner.

The averaged deal rate is then preferably computed, 23, as the volume difference divided by the time difference, as shown in the formula:

$$J = \frac{v_2 - v_1}{t_2 - t_1};$$

where J is the time-averaged deal rate, and $v_1$ and $v_2$ represent the volumes at the initial time ($t_1$) and the second time ($t_2$), respectively.

In the preferred embodiment of the present invention, once the spread and deal rate have been calculated, they can be plotted. Preferably, a scatter plot is employed to plot the logarithm of the spread (log(S)) versus the logarithm of the deal rate (log(J)), 25. Alternatively 24, using a best fit line in accordance with well-known statistical techniques, a slope (n) of the best fit line can be measured, 26. The scaling law for the spread as a function of deal rate is expected to be approximately –½ in the normal situation of quiet, stable markets. However, when momentum-trading begins, as it does at the onset of a large market movements, this value from approximately –½. Therefore, this value will vary depending upon market conditions.

In the preferred embodiment of the invention, the methods described above are encoded in a software program such that the steps of the method are performed relatively continuously and automatically. The program may then produce a recommendation to the user, 27, in accordance with its analysis of the liquidity scaling law:

$$S \sim J^n.$$

In addition, scaling laws with respect to other proxies of liquidity described above may be calculated as part of the preferred embodiment.

Any trader recommendations will vary, depending upon factors such as the results of the computed averages, and any inferences drawn therefrom. If a bias is detected, indicating the onset of momentum trading and its attendant unstable behavior, the recommendation will change depending upon whether a direction can be determined for this movement by independent means. If a direction can be inferred (e.g., by simply watching the market), then a buy or sell recommendation may be issued as appropriate. If a negative direction in the market is indicated, the recommendation may be to sell, as indicated in steps 28 and 31. If positive market movement is indicated, steps 29 and 32 show the invention will produce a buy recommendation. If a direction cannot be determined, then the trader may make money by buying option straddles, i.e., both a put and a call, which makes money regardless of direction, but requires a large market movement, steps 30 and 33. Otherwise, the recommendation may be to do nothing or "hold," as in steps 34 and 35.

Any recommendation will obviously vary depending upon market conditions. While the recommendations may be limited to "sell" 31, "buy" 32, "straddle" 33, or "hold" 35, the recommendations may be more elaborate, such as including an estimated price target at which the commodity should be bought or sold for optimum gain, or an estimated time to optimally execute the trade.

As stated above, the occurrence of a large difference between the buyers' and sellers' densities may cause the market to move in a direction that corrects such an imbalance. The expected size and timing of such a move may also be inferred by computing the conditional expectation of market movement given such a density imbalance. As indicated in FIG. 1, described above, this is sufficient information upon which to recommend a trading strategy, as follows:

1. Monitor average fluctuations, then use the curve calculated in accordance with the present invention to infer relative buyer/seller densities and their errors;
2. When a density difference occurs, use a pre-calculated curve of the conditional expectation of market move versus density difference curve to infer expected market movement, and expected time scale of movement. In some instances, calculating the expected market movement may be time-consuming (i.e., may require more past data than is currently available to the system), and thus may be calculated beforehand, maintained in a table, and referenced during trading;
3. Monitor the density difference to observe the difference of average densities and, compare expected market movement with movement thus far, inferring the remaining movement. Once this has opportunity has been observed, continue monitoring while the trade is put on to ensure no adverse movement; and/or
4. If the density difference dissipates before the market movement has occurred, or the movement has not yet occurred after a time longer than the expected time scale of the move, the trade is to be unwound.

Figure 3:
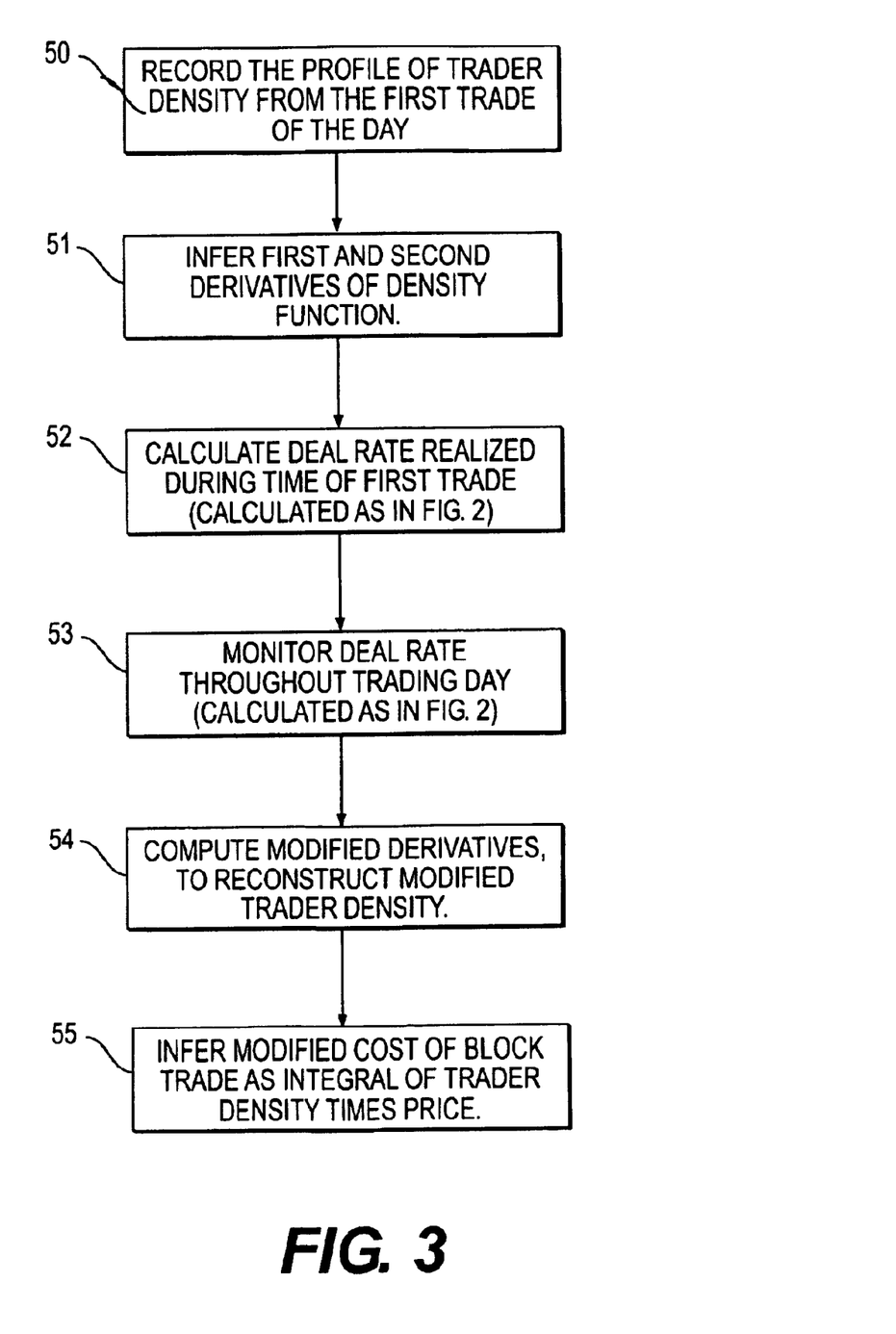
FIG. 3 is an alternative embodiment of the present invention.

As an alternative embodiment depicted in FIG. 3, consider a trader who must buy or sell a large block of shares. If the trader has no information other than that provided on a common trading screen, the trader may still use the fluctuations of the best bid or offer to infer the density of traders behind the best bid/offer. The trader may then estimate his expected cost for different trades by using the scaling laws described above for the derivatives of the density of traders.

In step 50 of FIG. 3, the profile of trader density is recorded, preferably from the first trade of the day. From this data, the first and second derivatives of the trader density function may be inferred, 51. These values are preferably used to show how trader density will change. The deal rate may then be calculated, 52, preferably as a time-averaged value, as described above. Next, the deal rate is preferably monitored throughout the time period, 53 (e.g., over the course of the trading day) for fluctuations and indications of market movement. As data is collected over the course of the trading day, the derivatives calculated in step 51 may be recalculated to track changes in trader density over time, 54. Finally, the cost of a block trade may be inferred based upon the integral of the trader density multiplied by the price, 55.

The alternative embodiment of FIG. 3 may be incorporated as a portion of the method of FIG. 2. Alternatively, the embodiment of FIG. 3 may be implemented independently in a manner similar to that of FIG. 2 to produce useful trader recommendations as described in the preferred embodiment.

In an alternative to the embodiment of FIG. 3, the invention may be used to estimate the costs to a trader of trading a large block of shares. Such a trader may perform the trade himself, or he may subcontract this arduous job out to someone who specializes in this type of trading (typically referred to as a "portfolio trading desk"). For example, mutual funds or derivatives traders often find themselves needing to suddenly trade large blocks of shares quickly and accurately, and they contract with portfolio trading desks to execute such difficult trades. Portfolio trading desks capitalize on their skill in deftly trading large blocks of stock without disturbing or exciting the market (which might inflict large costs on themselves and their clients).

As described above, the present invention may be used to estimate the costs of buying large blocks, by using the scaling behavior of the density of traders and its derivatives (see FIG. 3). To estimate such costs, the present invention estimates the density of traders all along the region of price space where trading may be expected to occur, 50, 51. This estimation may be calculated using a Taylor or Newton expansion, whose coefficients are to be estimated by the first several trades of the day, which will reveal the density of traders at that time. Later on in the day (or in the relevant time period), the invention measures the deal rate, and compares with the deal rate at the time of the initial trades, 52, 53. The derivatives calculated previously are then adjusted by the scale factors predicted as in FIG. 2, 54, 55. Typically, the first derivative of the density scales as the first power of the deal rate, and the second derivative scales as the 3/2 power of the deal rate.

Figure 4:
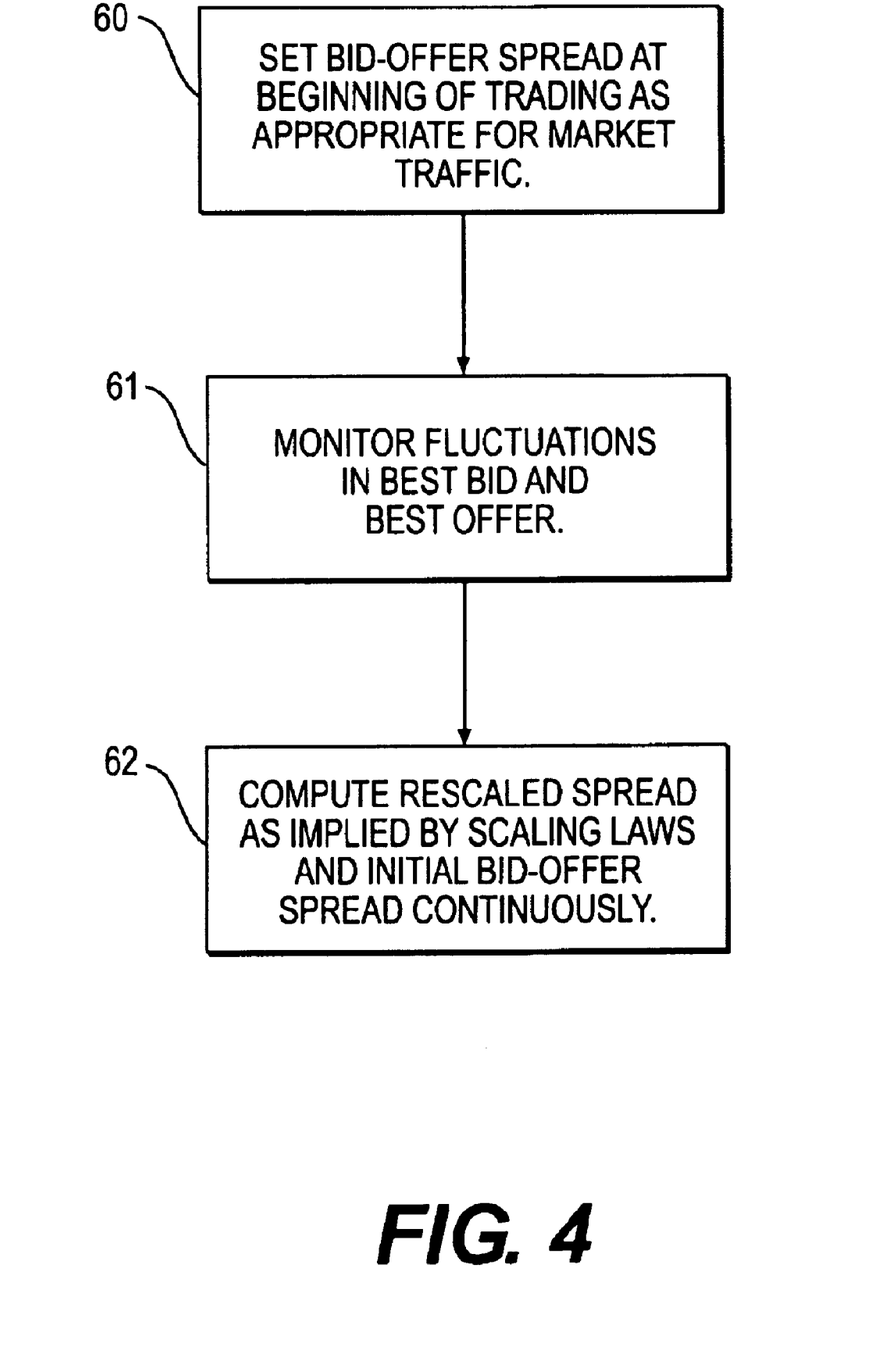
FIG. 4 is an alternative embodiment of the present invention.

Another embodiment of the present invention, depicted in FIG. 4, employs the methods of the invention in a market-maker application. Preferably, this embodiment involves employing the methods of the invention in an automated market maker system, in which the market-maker must set and maintain a bid and an offer in the market. Typically, a market-maker continuously set the bid and offer to maximize profit and minimize risk, readjusting the spread to reflect changing liquidity conditions in the market (i.e., the changing number of buyers and sellers). By observing fluctuations in the best bid and offer, or any of the other liquidity proxies, and calculating corresponding changes in the spread, the market-maker may understand through use of scaling laws such as those described above, over a very short time, how to rescale the spread to maximize profit and minimize risk.

The market-maker typically wants to set the spread narrowly, so that the market-maker receives a large number of trades, resulting in more profit. However, the market-maker does not want to set the spread so narrowly that the market-maker is in danger of accumulating a sudden excess of either buying or selling trades. This would increase the market-maker's risk. A market-maker may use the methods of the present invention to compute the expected profit and expected risk, and thus set spreads to an appropriate level of risk/profit.

Referring now to FIG. 4, step 60 indicates the initial step in this embodiment wherein an initial bid-offer spread is set. The initial spread is preferably calculated as the result of a model simulation, however, it may be computed in other ways such as on the basis of historical data, or it may simply set at a desired or arbitrary value. Next, the process preferably monitors fluctuations in the best bid and best offer, 61, thereby calculating fluctuations in the actual spread. As stated above, these values are preferably time-averaged with statistical certainties or errors associated therewith also being calculated. Finally, a rescaled spread may be computed, 62, as a value implied by scaling laws (such as those described above). Preferably, this process is repeated continuously over the course of a specified time period (e.g., a trading day).

Of course, these are just a few example of how a trading strategy may be formulated taking advantage of the market insights that the present invention provides. Since trading strategies differ widely, individual traders may employ the techniques of the present invention slightly differently, or may interpret the data differently, depending upon their individual needs. For example, one trader may consider a falling market as a time to get out and preserve whatever gains have been achieved, while another may view the same market conditions as a buying opportunity. Implementation of the invention may, thus, be modified to take into account a particular trader's buying strategy. Such a customized implementation could, for example, involve altering the value of the scaling law exponent (n) at which certain actions (e.g., buy, sell, etc.) are recommended.

As stated above, the preferred embodiment of the present invention comprises a computer program for applying the methods of the invention in an automated fashion. The program preferably measures the liquidity proxies continually, as well as their fluctuations and scaling laws, and reports to the user moving averages over short time scales. The time scale and corresponding accuracy may be user-inputted parameters. The program can also use the results of the model to report to the user expected market moves based on the resulting state the program perceives.

In the preferred embodiment, the software program is written in the C++ language. Of course, the invention is not limited to any particular computing language. Preferably, the data is first read into a simple container class that contains a linked list of snapshots of the relevant fields on a trading screen, i.e., the market observables: best bid, best offer, bid size, offer size, and volume, as well as the time of the image. The class provides access to the data through functions whose argument is the time, and which return a single snapshot of the trading screen.

Preferably, the data in the initial data container object is analyzed through a series of testing classes, all derived from a base class (herein referred to as "Test_run," but whose name may differ) containing the logical rules for calculating a particular scaling law. In the preferred embodiment of the invention each testing class calculates several statistical averages. There are many kinds of statistical averages that may be employed in the embodiments of the present invention including, but not limited to, ordinary arithmetic means, average fluctuations in the mean, time-weighted averages, average fluctuations in a time-weighted mean, and averages that calculate correlations. The standard mathematics of each of these averages is encapsulated in classes inherited from Expectation, called ExpectationI, ExpectationII, TSExpectationI, TSExpectationII, and Correlation. A testing class inherited from the base class, Test_run, preferably contains several of these Expectation classes. The base class is preferably given a pointer to the data container, and it iterates through the snapshot images, passing each one to the each of the Expectation classes it has as they accumulate the desired averages, and also compute the applicable statistical errors.

In the preferred embodiment, when the errors of each of the Expectation classes are small enough, the testing class makes a DataElement out of each of the results of each of the Expectations. All of these DataElements together form a DataPoint, and this DataPoint is appended to a DataCurve. A DataElement preferably comprises an average together with its error, preferably containing double precision numbers for averages, lower error limits, and upper error limits. A DataPoint contains an n-vector of DataElements, where n is the number of Expectations in the Test_run class, which itself depends on the dimension of the scaling law. The DataCurve is a linked-list of DataPoints, which corresponds to the scatter plot for the full scaling law. The DataPoint is thus a single point in the scatter plot.

If, for example, the testing class calculates the spread versus deal rate scaling law, only the averaged spread and the average deal rate must be calculated, the DataPoint thus will contain only a two dimensional vector, and the program will contain two Expectation Objections, of the type ExpectationI.

On the other hand, consider the expectation of the market movement conditioned on the difference in averaged fluctuations of the best bid and best offer. The Test_run class preferably contains two ExpectationII classes. One each for the fluctuations in the best bid and best offer, one ExpectationI class for the Deal Rate and one ExpectationI class for the market movement. A DataPoint in this case contains four DataElements, one each for the difference of the fluctuations, the time of the forward snapshot of the market movement, the deal rate, and the size of the market movement. The fluctuations should be put into "bins," i.e., small ranges that are considered close enough to be equal, and the calculation must be redone for each forward time.

A scatter plot for the logarithm involves taking the logarithm of each data member of the DataElement, and the DataCurve provides a simple LogTransform function, which does this. The DataCurve also provides a linear regression function so that the slope of the log-transformed curve, i.e., the scaling exponent, may be directly calculated.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method of determining the current state of a market and producing market state data in accordance with a current market condition, said method comprising the steps of:

obtaining initial market data at an initial time ($t_1$), said market data comprising at least a best bid, best offer and market volume ($v_1$) at the initial time;

obtaining second market data at a second time ($t_2$), the second time being later than the initial time, said second market data comprising at least a best bid, best offer and market volume ($v_2$) at the second time;

calculating a bid-offer spread (S) from at least one of the initial market data and the second market data;

calculating an average deal rate (J) in accordance with the following formula:

$$J = \frac{v_2 - v_1}{t_2 - t_1};$$

calculating an exponent (n) of a scaling law;

determining a current market liquidity condition in accordance with the scaling law:

$S \sim J^n$; and producing a market liquidity assessment in accordance with the current market liquidity condition; wherein at least one of the steps of calculating a bid-offer spread, calculating an average deal rate, calculating an exponent of a scaling law, and determining a current market liquidity condition is performed by a computer.

2. The method of claim 1, wherein said step of producing a market liquidity assessment comprises generating a trader recommendation as to recommended trading activity.

3. The method of claim 2, wherein said step of producing a market liquidity assessment comprises recommending the trader sell if the exponent (n) is less than approximately –½ and the current market liquidity condition indicates negative market movement.

4. The method of claim 2, wherein said step of producing a market liquidity assessment comprises recommending the trader buy if the exponent (n) is less than approximately –½ and the current market liquidity condition indicates positive market movement.

5. The method of claim 2, wherein said step of producing a market liquidity assessment comprises recommending the trader buy an option straddle position if the exponent (n) is less than approximately –½ and the current market liquidity condition does not indicate market movement.

6. The method of claim 2, wherein said step of producing a market liquidity assessment comprises recommending the trader hold if the exponent (n) is approximately equal to –½.

7. The method of claim 1, wherein the market is a double auction market.

8. The method of claim 1, wherein the market is one of a stock market, an options market, and a bond market.

9. The method of claim 1, wherein the second time is approximately 0.1 second later than the initial time.

10. The method of claim 1, wherein the second time is between approximately 0.1 second and approximately 0.1 second later than the initial time.

11. The method of claim 1, wherein said step of obtaining initial market data and said step of obtaining second market data each comprise receiving market data via the Internet.

12. The method of claim 1, further comprising the steps of:

recording the initial market data; and recording the initial time.

13. The method of claim 12, further comprising the steps of:

calculating a fluctuation in the average bid-offer spread; and calculating a fluctuation in an average trade price;

wherein said step of producing a market liquidity assessment is based at least in part upon the fluctuation in the average bid-offer spread and the fluctuation in an average trade price.

14. The method of claim 1, further comprising the steps of:

recording the second market data; and recording the second time.

15. The method of claim 1, wherein the bid-offer spread is an average bid-offer spread that is time-averaged over the range of time from the initial time to the second time.

16. The method of claim 15, further comprising the steps of:

calculating a statistical error associated with the average bid-offer spread;

repeatedly obtaining subsequent market data, said subsequent market data comprising at least best bid and best offer at times subsequent to the second time; and repeatedly recalculating the average bid-offer spread and the statistical error associated therewith until the statistical error is below a predetermined accuracy.

17. The method of claim 16, wherein said step of calculating an exponent of a scaling law comprises plotting the logarithm of the average bid-offer spread against the logarithm of the average deal rate and calculating the slope of the resulting line.

18. The method of claim 17, further comprising the steps of:
   calculating a statistical error associated with the average deal rate;
   repeatedly obtaining subsequent market data, said subsequent market data comprising at least market volume data at times subsequent to the second time;
   repeatedly recalculating the average deal rate and the statistical error associated therewith until the statistical error is below a desired accuracy;
   repeatedly recalculating the exponent (n) of a scaling law by plotting a logarithm of the average bid-offer spread against a logarithm of the average deal rate and calculating a slope of a resulting line, the exponent being equal to the slope of the resulting line; and
   repeatedly determining a current market liquidity condition.

19. The method of claim 1, further comprising the steps of:
   calculating a statistical error associated with the average deal rate;
   repeatedly obtaining subsequent market data, said subsequent market data comprising at least market volume data at times subsequent to the second time; and
   repeatedly recalculating the average deal rate and the statistical error associated therewith until the statistical error is below a predetermined accuracy.

20. The method of claim 1, wherein said step of calculating an exponent (n) of a scaling law comprises plotting a logarithm of the bid-offer spread (S) against a logarithm of the average deal rate (J) and calculating a slope of a resulting line, said exponent (n) being equal to the slope of the resulting line.

21. The method of claim 1, wherein said step of calculating an exponent comprises making a scatter plot of the logarithm of the bid-offer spread (S) versus the logarithm of the average deal rate (J) and computing a best-fit line to the scatter plot data, the exponent being equal to the slope of the best-fit line.

22. The method of claim 1, wherein said initial market data and said second market data further comprise bid size and offer size data.

23. The method of claim 1, further comprising the step of calculating an average time to midmarket trade;
   wherein said step of producing a market liquidity assessment is based at least in part upon the average time to midmarket trade.

24. The method of claim 1, further comprising the steps of:
   calculating an average bid size; and
   calculating an average offer size;
   wherein said step of producing a market liquidity assessment is based at least in part upon the average bid size and average offer size.

25. A method of assessing market conditions and issuing trader recommendations in accordance with a current market condition, said method comprising:
   creating a record of initial market data, comprising at least a best bid, best offer, market volume data, and current time at an initial time ($t_1$);
   creating a record of second market data, comprising at least a best bid, best offer, market volume data, and current time at a second time ($t_2$), the second time being later than the initial time;
   computing a bid-offer spread (S) from at least one of the initial market data and the second market data;
   computing a statistical average deal rate (J) based upon at least part of the initial market data and at least part of the second market data;
   calculating an exponent (n) of a scaling law;
   determining a current market liquidity condition in accordance with the scaling law:

$S \sim J^n$; and producing a market liquidity assessment in accordance with the current market liquidity conditions;
   wherein said step of producing a market liquidity assessment comprises generating a trader recommendation as to recommended trading activity; wherein at least one of the steps for computing a bid-offer spread, computing a statistical average deal rate, calculating an exponent of a scaling law, determining a current market liquidity condition, and producing a market liquidity assessment is performed by a computer.

26. The method of claim 25, wherein said step of computing a statistical average deal rate (J) comprises computing the statistical average deal rate (J) in accordance with the formula:

$$J = \frac{v_2 - v_1}{t_2 - t_1}.$$

27. The method of claim 25, wherein the market is a double auction market.

28. The method of claim 25, wherein the market is one of a stock market, an options market, and a bond market.

29. The method of claim 25, wherein the second time is approximately 0.1 second later than the initial time.

30. The method of claim 25, wherein the second time is between approximately 0.1 second and approximately 1.0 second later than the initial time.

31. The method of claim 25, wherein the bid-offer spread is an average bid-offer spread that is time-averaged over the range of time from the initial time to the second time.

32. The method of claim 31, further comprising the steps of:
   calculating a statistical error associated with the average bid-offer spread;
   repeatedly obtaining subsequent market data, said subsequent market data comprising at least best bid and best offer at times subsequent to the second time; and
   repeatedly recalculating the average bid-offer spread and the statistical error associated therewith until the statistical error is below a desired accuracy.

33. The method of claim 25, wherein said step of calculating an exponent (n) of a scaling law comprises plotting a logarithm of the bid-offer spread (S) against a logarithm of the average deal rate (J) and calculating a slope of a resulting line, the exponent (n) being equal to the slope of the resulting line.

34. The method of claim 25, wherein said step of calculating an exponent comprises making a scatter plot of the logarithm of the bid-offer spread (S) versus the logarithm of the average deal rate (J) and computing a best-fit line to the scatter plot data, the exponent (n) being equal to the slope of the best-fit line.

35. The method of claim 25, wherein said step of producing a market liquidity assessment comprises recommending the trader sell if the exponent (n) is less than approximately −½ and the current market liquidity condition indicates negative market movement.

36. The method of claim 25, wherein said step of producing a market liquidity assessment comprises recommending the trader buy if the exponent (n) is less than that approximately −½ and the current market liquidity condition indicates positive market movement.

37. The method of claim 25, wherein said step of producing a market liquidity assessment comprises recommending the trader buy an option straddle position if the exponent (n) is less than approximately −½ and the current market liquidity condition does not indicates market movement.

38. The method of claim 25, wherein said step of producing a market liquidity assessment comprises recommending the trader hold if the exponent (n) is approximately equal to −½.

39. An automated market-maker system for establishing bid and offer prices for commodities being traded on a market, wherein said system comprises:
   means for receiving market data comprising at least best bid and best offer data;
   means for monitoring fluctuations in the best bid and best offer data;
   means for determining a current market liquidity state; and
   means for calculating an optimal bid-offer spread based upon the current market liquidity state; wherein the market comprises:
   means for recording initial market data at an initial time ($t_1$) comprising at least a best bid, best offer and market volume ($v_1$) at the initial time; and
   means for recording second market data at a second time ($t_2$), the second time being later than the initial time, comprising at least a best bid, best offer and market volume ($v_2$) at the second time; and wherein the market liquidity state is determined by:
   calculating a bid-offer spread (S) from at least one of the initial market data and the second market data;
   calculating an average deal rate (J) in accordance with the following formula:

$$J=(v_2-v_1)/(t_2-t_1);$$

calculating an exponent (n) of a scaling law; and
   determining a current market liquidity condition in accordance with the scaling law:

$$S \sim J^n.$$

40. The system of claim 39, wherein the exponent (n) is calculated by plotting a logarithm of the bid-offer spread (S) against a logarithm of the average deal rate (J) and calculating a slope of a resulting line, said exponent (n) being equal to the slope of the resulting line.

41. The system of claim 39, wherein said system further comprises:
   means for continuously receiving market data comprising at least best bid and best offer data over a period of time;
   means for continuously monitoring fluctuations in the best bid and best offer data over said period of time;
   means for continuously recalculating the current market liquidity state; and
   means for continuously recalculating the optimal bid-offer spread based upon the current market liquidity state.

* * * * *